United States Patent
Fischer

(10) Patent No.: US 9,858,252 B2
(45) Date of Patent: Jan. 2, 2018

(54) MULTIPLE GRAPHICAL ANNOTATIONS OF DOCUMENTS USING OVERLAYS

(71) Applicant: salesforce.com, inc., San Francisco, CA (US)

(72) Inventor: Ronald F. Fischer, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 14/700,392

(22) Filed: Apr. 30, 2015

(65) Prior Publication Data

US 2015/0293892 A1   Oct. 15, 2015

Related U.S. Application Data

(62) Division of application No. 13/112,855, filed on May 20, 2011.

(60) Provisional application No. 61/346,844, filed on May 20, 2010.

(51) Int. Cl.
*G06F 17/24* (2006.01)
*G06F 17/21* (2006.01)

(52) U.S. Cl.
CPC .......... *G06F 17/241* (2013.01); *G06F 17/211* (2013.01)

(58) Field of Classification Search
CPC .............................. G06F 17/241; G06F 17/211
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,893,126 A * | 4/1999 | Drews .................. G06F 3/0481 715/203 |

(Continued)

OTHER PUBLICATIONS

Adobe Acrobat 9 PDF Bible, Ted Padova, John Wiley & Sons, Nov. 17, 2008, pp. 653-731.*

(Continued)

*Primary Examiner* — Scott Baderman
*Assistant Examiner* — Mario M Velez-Lopez
(74) *Attorney, Agent, or Firm* — Schwabe Williamson & Wyatt

(57) ABSTRACT

Systems and methods for sharing document annotations. A document is displayed on a graphical user interface and first annotation information for the document is created by a first user, the annotation information including first annotations and positioning information for positioning a first overlay window relative to the document. The first overlay window with the first annotations is displayed over the document wherein the document is visible through the first overlay window. The annotation information is sharable with other users, whereby a different user is able to display the overlay with annotations made by the first user over the document on a different system, and the annotations do not modify the underlying document.

20 Claims, 7 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| 6,342,906 B1 | 1/2002 | Kumar |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,732,330 B1 * | 5/2004 | Claussen ............. G06F 9/45512 707/E17.118 |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,370,269 B1 * | 5/2008 | Prabhu ............. G06F 17/30873 715/201 |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,590,947 B1 | 9/2009 | Gay |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,195,659 B2 * | 6/2012 | Hull ............. G06K 9/00442 707/736 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0146934 A1 | 8/2003 | Bailey |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0122898 A1 | 6/2004 | Srinivasa |

(56) References Cited

U.S. PATENT DOCUMENTS

| | | |
|---|---|---|
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0094732 A1 | 5/2005 | Mukherjee |
| 2005/0097169 A1* | 5/2005 | Mukherjee ............... G09B 5/06 709/204 |
| 2006/0200760 A1* | 9/2006 | Sellers .................. G06F 17/211 715/209 |
| 2006/0215630 A1* | 9/2006 | Hwang ............... H04L 12/1827 370/351 |
| 2007/0208994 A1* | 9/2007 | Reddel ............... G06F 17/2288 715/205 |
| 2007/0234209 A1 | 10/2007 | Williams |
| 2007/0266335 A1* | 11/2007 | Zielinski ............... G06F 3/0481 715/787 |
| 2008/0222542 A1 | 9/2008 | Woolf |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2011/0289401 A1 | 11/2011 | Fischer |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |

OTHER PUBLICATIONS

Adobe Acrobat 9 PDF Bible, Ted Padova, John Wiley & Sons; Nov. 17, 2008; pp. 653-731.

Adobe Acrobat 9 Pro, Version 9.3.1; Feb. 2010; pp. 1-12.

\* cited by examiner

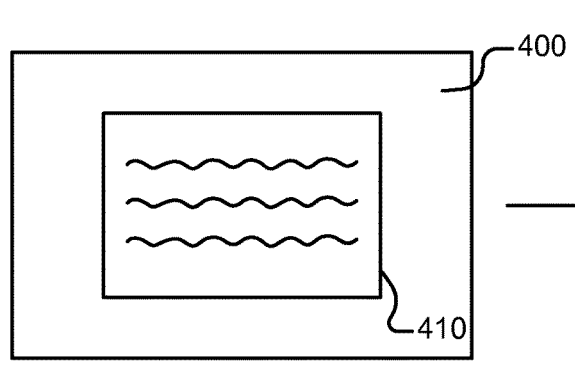 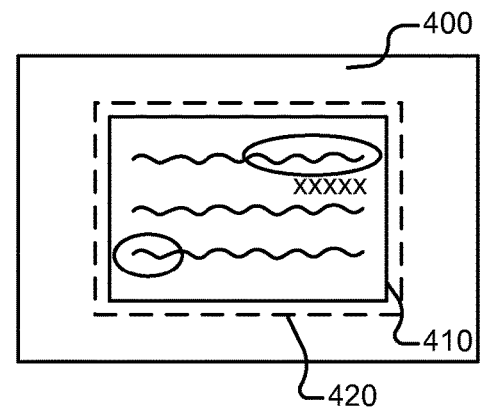
FIG. 4A  FIG. 4B

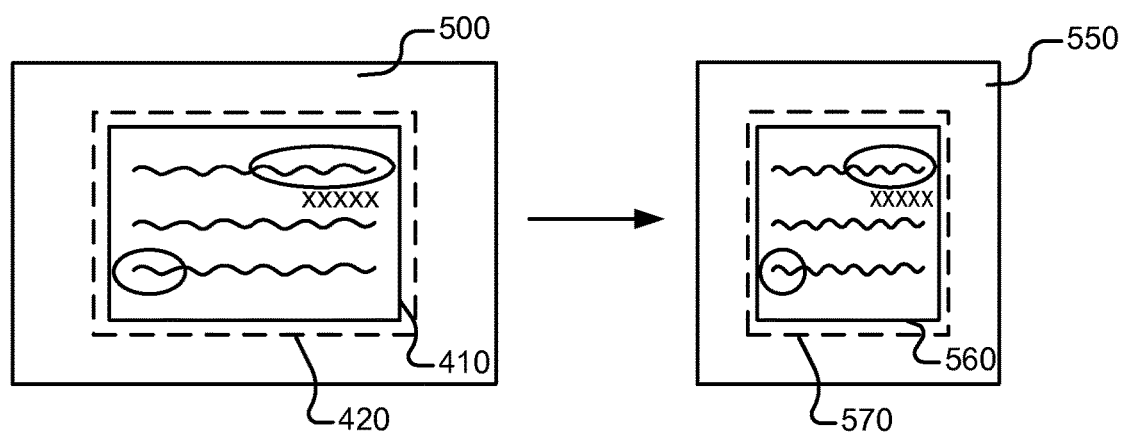
FIG. 5A         FIG. 5B

MULTIPLE GRAPHICAL ANNOTATIONS OF DOCUMENTS USING OVERLAYS

CROSS-REFERENCES TO RELATED APPLICATIONS

This application is a divisional of U.S. patent application Ser. No. 13/112,855, filed May 20, 2011, which claims the benefit of U.S. Provisional Application Ser. No. 61/346,844, filed May 20, 2010, which are both herein incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present generally relates to sharing documents, and more particularly to sharing one or multiple graphical annotations of a document using overlays.

Often when collaborating on a document there is a desire to annotate the document and consider a variety of information and approaches. For many document types, certain annotation tools already exist (for instance, change tracking in MS Word, or comment balloons in PDF files). These tools either support the direct manipulation of the document or allow users to annotate the documents, share the annotations and eventually coalesce the annotations into one and only one set. It can be cumbersome, however, using existing technologies to remove changes that are part of the document and/or wade through the various changes or comments made by various users when multiple users are commenting on, or modifying a document.

There is therefore a need for improved systems and methods that overcome the above problems and that provide improved document collaboration capabilities.

SUMMARY

The present invention generally relates to document sharing and collaboration, and more particularly to providing graphical annotations of documents using overlays. The techniques are applicable for use in an on-demand database and/or application service or any environment or environments in which electronic documents are shared or exchanged.

According to one embodiment, a computer-implemented method is provided for sharing document annotations. The method typically includes displaying a document on a first graphical user interface, displaying a document overlay window over the document, wherein the document is visible through the overlay window, and receiving annotations from a first user via a user-input device. The input device may include a mouse or keyboard, or a touch screen (e.g., user gestures on a touch-screen, such as a tablet computer, touch-screen peripheral, iPad, or mobile cell phone device such as a Blackberry or an iPhone). The method also typically includes displaying the annotations in the overlay window, storing annotation information, the annotation information including the annotations and positioning information for the overlay window relative to the document, and allowing access to the document and the annotation information to a second user. The method further typically includes displaying the document and the overlay window with the annotations on a second graphical user interface, whereby the second user is able to see the annotations overlaying the document when the overlay window is displayed on the second graphical user interface. In certain aspects, allowing access to the document and the annotation information includes either a) sending to the second user the annotation information and the document, or b) storing the annotation information and the document to a server system, whereby the second user retrieves the stored annotation information and the document from the server system. In certain aspects, the positioning information is used to facilitate the alignment of the overlay on devices or systems having a different or alternate resolution interfaces. In certain aspects, the first graphical user interface has a first resolution and the second graphical user interface has a second resolution different than the first resolution, wherein displaying the document and the overlay window with the annotations on the second graphical user interface includes scaling the size of the displayed overlay window and annotations to match the second resolution based on the annotation information.

According to another embodiment, a computer-implemented method is provided for sharing document annotations. The method typically includes displaying a document on a graphical user interface, receiving first annotation information for the document created by a first user, the annotation information including first annotations and positioning information for positioning a first overlay window relative to the document; and displaying the first overlay window with the first annotations over the document wherein the document is visible through the first overlay window.

According to yet another embodiment, a tangible computer-readable medium is provided that stores code which, when executed by one or more processors, causes the processor(s) to display a document on a graphical user interface, to receive first annotation information for the document created by a first user, the annotation information including first annotations and positioning information for positioning a first overlay window relative to the document, and to display the first overlay window with the first annotations over the document wherein the document is visible through the first overlay window.

According to still another embodiment, a tangible computer-readable medium is provided that stores code for enabling sharing of document annotations. The code typically includes instructions that when executed by one or more processor cause the processor(s) to display a document on a first graphical user interface, to display a document overlay window over the document, wherein the document is visible through the overlay window, and to receive annotations from a first user via a user-input device. The code also typically includes instructions to display the annotations in the overlay window, to store annotation information, the annotation information including the annotations and positioning information for the overlay window relative to the document, and to allow access to the document and the annotation information to a second user. The code further typically includes instructions to display the document and the overlay window with the annotations on a second graphical user interface, whereby the second user is able to see the annotations overlaying the document when the overlay window is displayed on the second graphical user interface. In certain aspects, the code to allow access includes either: a) code to send to the second user the annotation information and the document, or b) code to enable the second user to retrieve the annotation information and the document from a server system.

According to yet a further embodiment, a document sharing system is provided that typically includes a display device for displaying a graphical user interface, and a processor configured to display a document on the graphical user interface, to receive first annotation information for the document created by a first user, the annotation information including first annotations and positioning information for positioning a first overlay window relative to the document, and to display the first overlay window with the first annotations over the document wherein the document is visible through the first overlay window.

According to still a further embodiment, a document sharing system is provided that typically includes a first computer system having a display device for displaying a first graphical user interface, and a first processor configured to display a document on the graphical user interface, to display a document overlay window over the document, wherein the document is visible through the overlay window, to receive annotations from a first user via a user-input device, and to display the annotations in the overlay window. The first processor is also typically configured to store annotation information, the annotation information including the annotations and positioning information for the overlay window relative to the document, and to allow access to the document and the annotation information to a second user. The system also typically includes a second computer system, communicably coupled with the first computer system over a network, the second computer system having a display device for displaying a second graphical user interface, and a second processor configured to display the document and the overlay window with the annotations on the second graphical user interface, whereby the second user is able to see the annotations overlaying the document when the overlay window is displayed on the second graphical user interface. In certain aspects, the first processor allows access to the document and the annotation information by a) sending to the second computer system the annotation information and the document, or b) storing the annotation information and the document to a server system, whereby the second computer system retrieves the stored annotation information and the document from the server system.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 4A illustrates a graphical user interface display including a document displayed therein.

FIG. 4B illustrates an overlay window displayed over the displayed document.

FIG. 5A illustrates a graphical user interface display on the second user's system where the resolution is the same as on the first user's system.

FIG. 5B illustrates a situation where the second user's system has a different resolution and/or aspect ratio than the first user's system.

DETAILED DESCRIPTION

The present invention provides systems and methods for document sharing and collaboration, and more particularly for providing graphical annotations of documents using overlays. The various embodiments are useful in an on-demand multi-tenant database and/or application service or any system or systems in which electronic documents are shared or exchanged.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers.

System Overview

Figure 1:
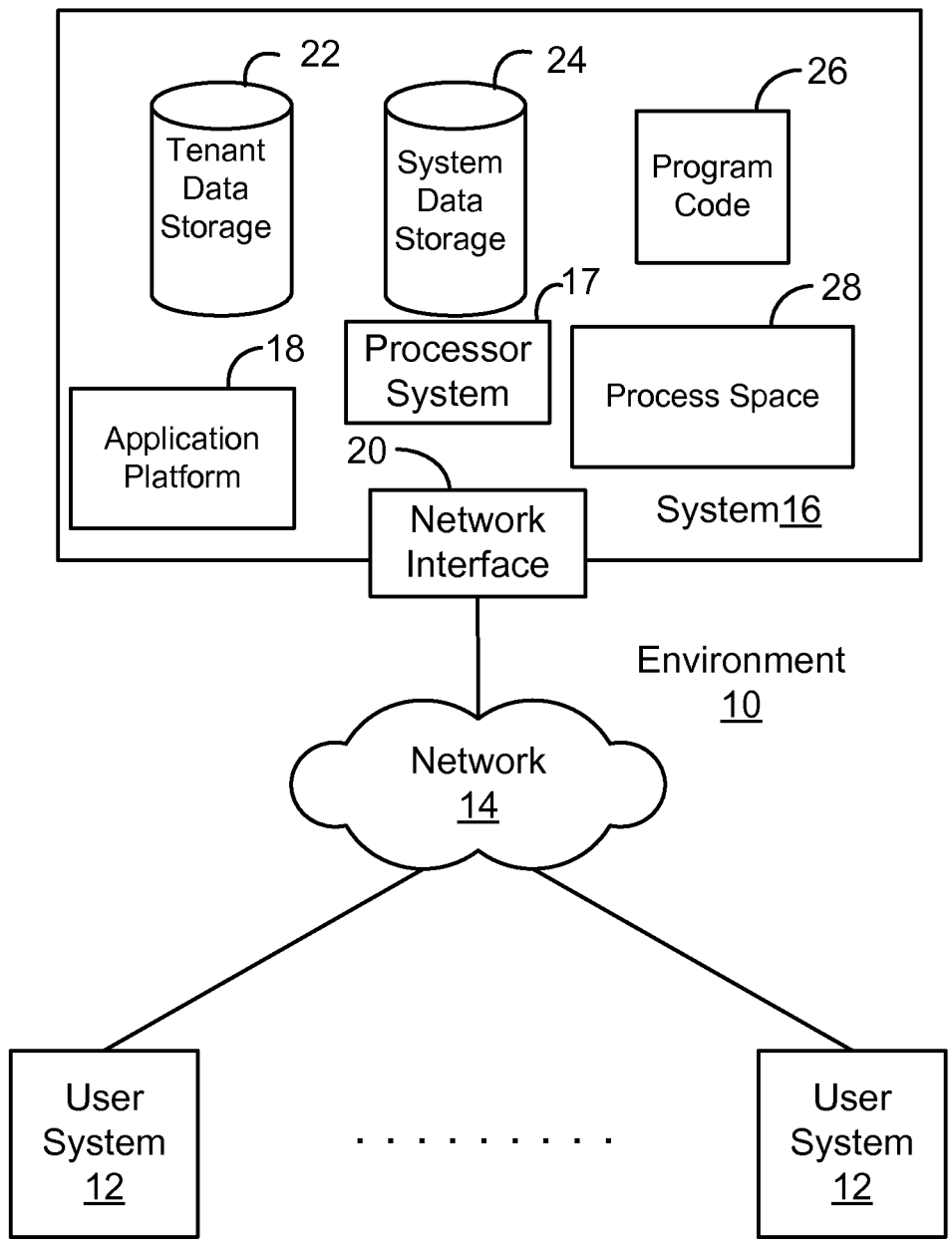
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, such as documents and annotation overlays as discussed below, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications (such as a browser application, a document viewer or editing application, etc.) including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
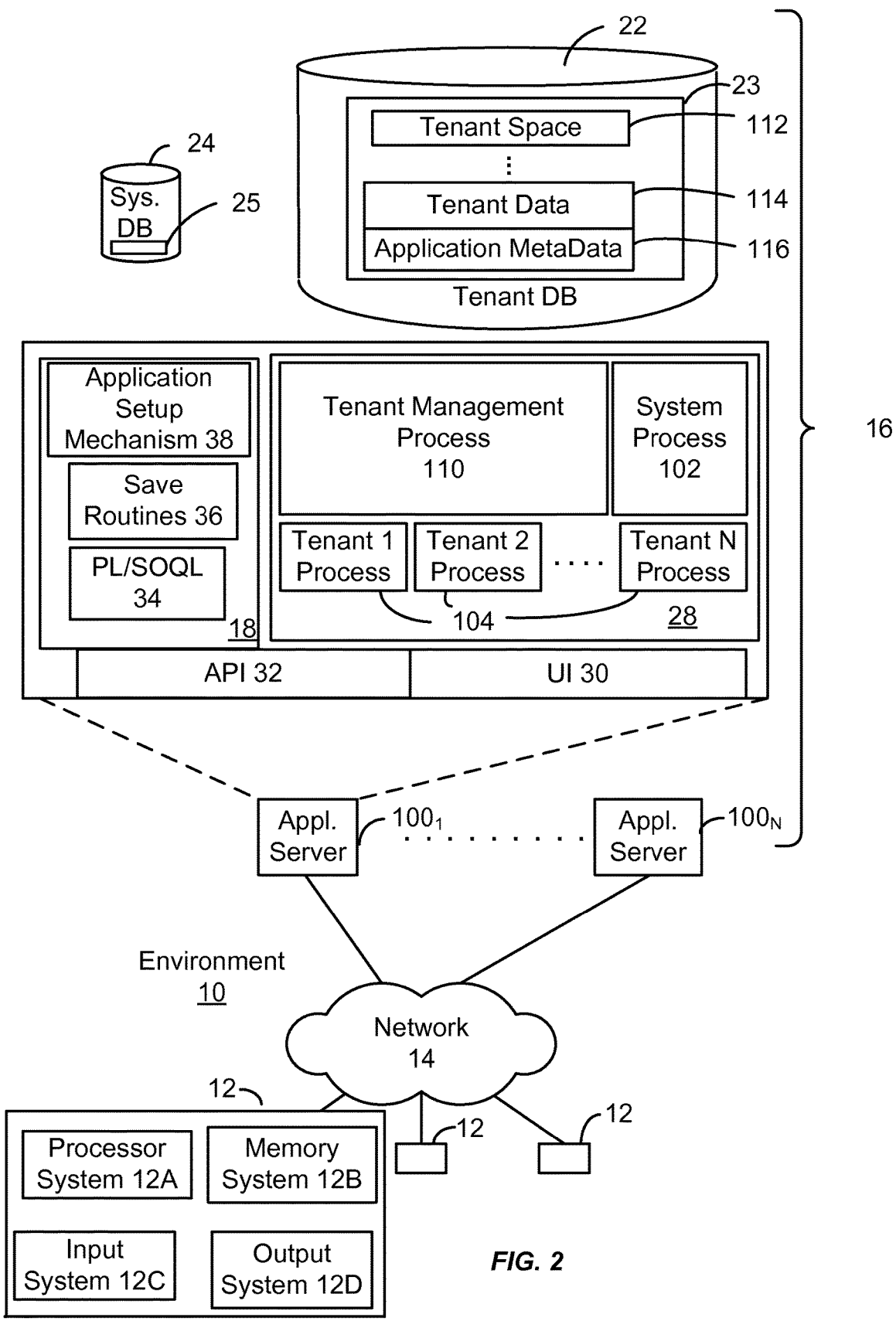
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system.

Graphical Annotations of Documents Using Overlays

Often when collaborating on a document there is a desire to annotate the document and consider a variety of information and approaches. This is true whether the document under discussion is primarily text, image, graphical design, video or some other document type. The collaboration can include a single user or multiple users proposing changes or modifications either offline, or in a live, online setting. For most specific document types, certain annotation tools already exist (for instance, change tracking in MS Word, or comment balloons in PDF files). These tools either support the direct manipulation of the document or allow users to annotate the documents, share the annotations and eventually coalesce the annotations into one and only one set.

According to one embodiment, a system is provided that works across any document type by providing visual overlays on top of a document without modifying the original document. Multiple, alternative annotations can exist together or independently.

In an interactive online environment, any drawing on an overlay can be immediately shared with other users. Since overlays are transparent, multiple overlays may be shown at the same time. These overlays could be from one or more users. If multiple overlays are created, a display order is maintained in one embodiment. Initially, this can be the order in which they were created, but it is possible to override this default manually. By maintaining an overlay order it is possible to annotate an existing overlay.

Document Overlays

Figure 3:
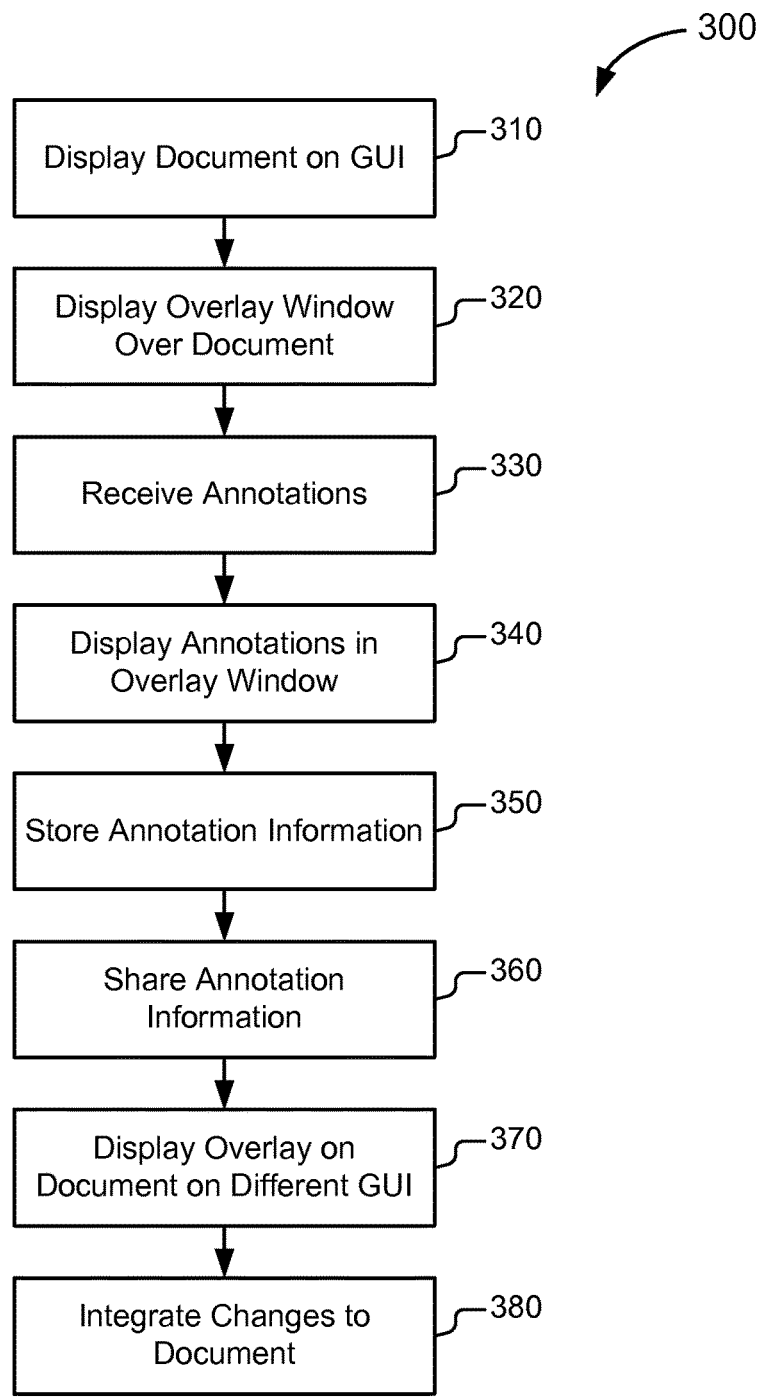
FIG. 3 illustrates a method of creating and sharing document annotations according to one embodiment.

FIG. 3 illustrates a method 300 of creating and sharing document annotations according to one embodiment. In step 310, a document is created or accessed or retrieved and displayed on a graphical user interface. For example, a user may create a document to be shared for collaboration using any of a variety of document creation applications, or the user may retrieve a document from storage, or a user may receive a document from another user or source. Examples of document types include text-based documents, image-based documents, video-based documents, or any other document type viewable on a graphical user interface. Specific examples include Word documents, PowerPoint documents, Visio document, Flash-based images or videos, and Excel spreadsheets, however one skilled in the art will understand that any document type may be created or accessed using any document creation or editing application.

Figure 6:
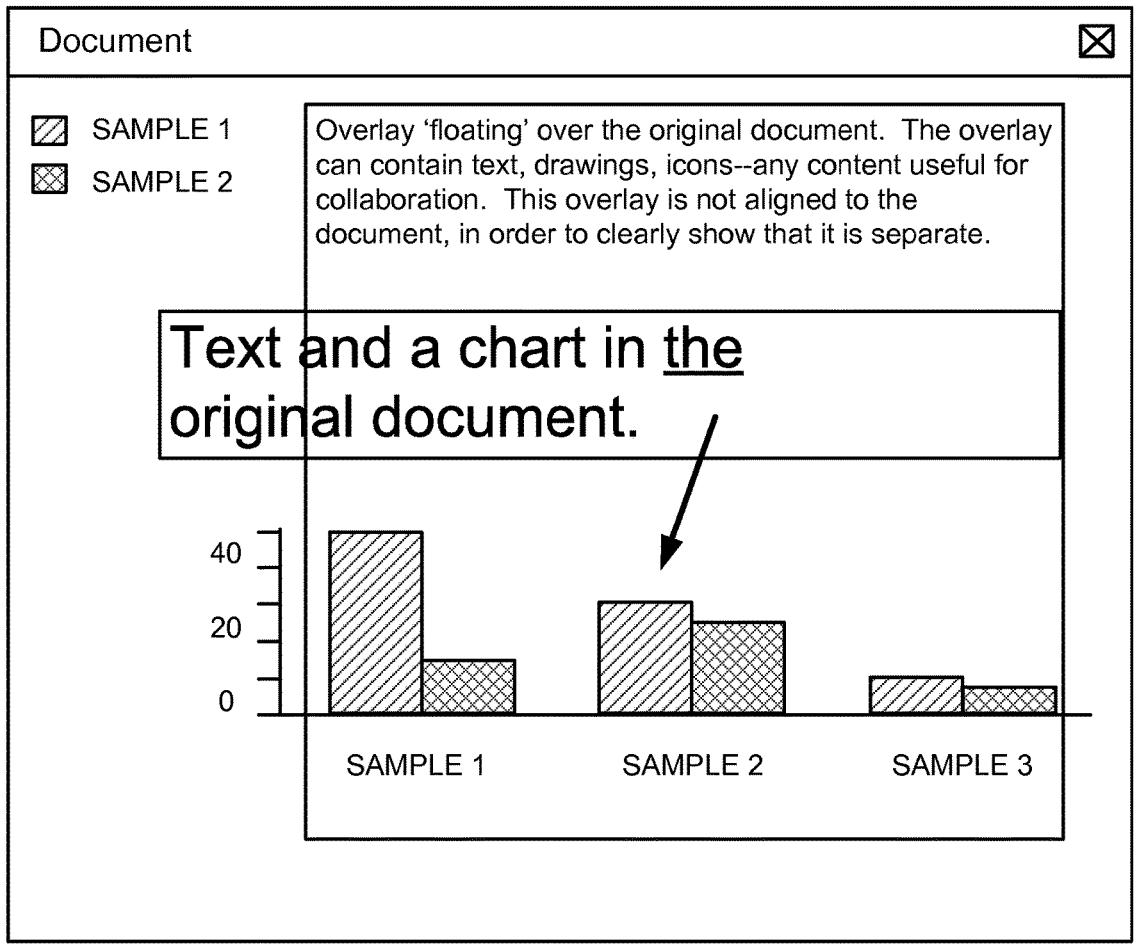
FIG. 6 illustrates an example of an overlay floating over a document according to one embodiment.
Figure 7:
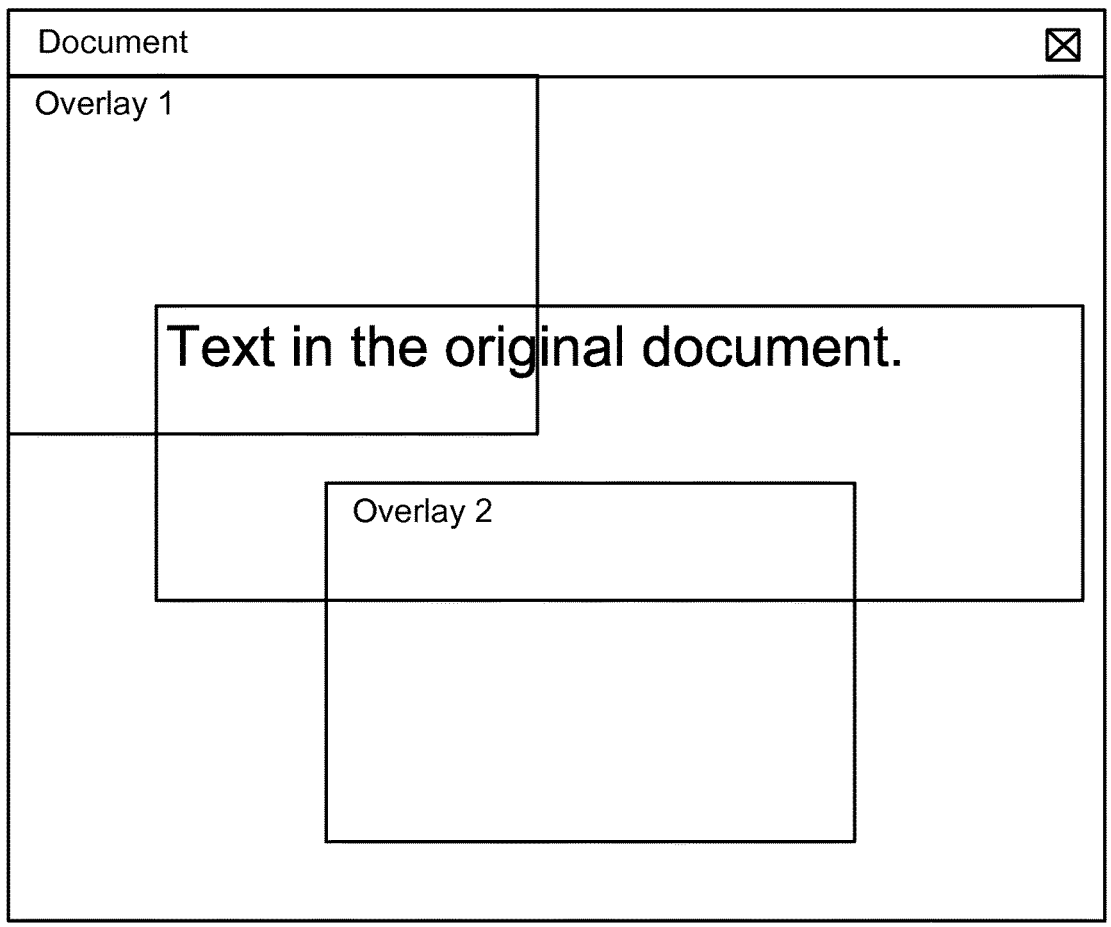
FIG. 7 illustrates an example of two different overlays displayed over a document according to one embodiment.

In step 320, a document overlay window is displayed over the document, for example in response to a user request to provide annotations to the displayed document. The user request may be by way of accessing a specific application (e.g., a stand-alone application) designed to generate the document overlay, or using functionality included and integrated with a document editing tool. In step 330, document annotations are input by a user using a user input device, and the annotations are displayed in the overlay window in step 340. FIG. 4a illustrates a graphical user interface display 400 including a document 410 displayed therein. As shown, the document 410 represents a text based (e.g., a Word document). FIG. 4b illustrates an overlay window 420 displayed over document 410 in display 400. As shown in FIG. 4b, the overlay window 420 includes annotations provided by a user; specifically the annotations shown include two handwritten "circle" marks and some text: "xxxxx", as input by the user. Also as shown, the boundary of the overlay window is larger than the document, however, the boundary may be configurable such that the user can make the boundary smaller or larger than the document, e.g., by selecting an icon on or by the overlay and adjusting the size/dimensions thereby. FIGS. 6 and 7 show example of smaller overlays displayed over a document. Also, controls are provided to a user to change the positioning of the displayed overlay relative to the document, e.g., by selecting the overlay and dragging to a new position.

User input may include handwritten or typed text, or pasting of documents, icons or images selected from the user's system. In one embodiment, an overlay includes a transparent work area which aligns with the document, a border indicator to show the bounds of the overlay, and overlay controls. The overlay window within the border indicator is transparent, in certain aspects, to allow unfettered viewing of the document contents. The user can use standard controls to create annotations, e.g., by drawing or typing on top of an overlay, using any user input device, such as a mouse, keyboard, pen or stylus, touch-screen or touch pad, etc. The user's input will appear as if it is located (e.g., written) on top of the underlying document. In certain aspects, drawing controls include lines, standard shapes, useful icons, text and images.

In step 350, annotation information is stored to the system, e.g., local system memory, or persisted to a remote memory such as a database system or application server. The stored information includes the annotations provided by the user as well as positioning information such as the position(s) of annotations within the overlay window, and positioning information of the overlay window relative to the document. To facilitate the alignment of the overlay relative to the document on devices or systems having a different or alternate resolution interfaces such positioning information might include the document size/resolution, the document zoom, and the document position. Using this information an overlay can be scaled for a different interface such that it closely matches its original position relative to the document on a different interface.

In step 360, the annotation information is shared with another user. For example, in one embodiment, the user that creates the annotations allows access to the annotations to a second user. In one embodiment, this includes sending the annotation information to the second user (e.g., the second user's computer system) by way of a network connection, such as a VPN, WAN, LAN, Internet, etc. In another embodiment, this includes enabling the second user to retrieve the annotation information, e.g., from memory or a server system, such as by sending a link to the annotation information, or otherwise alerting the second user that the annotation information may be accessed. In certain embodiments, the document may also be sent with, or retrieved with, the annotation information. For example, if the second user already has access to the document, only the annotation information need be enabled for access. This may occur where the second user is the creator of the document, or where the second user may have already accessed the document and asked the first user for comments/annotations.

In step 370, the annotation information accessed or received by the second user is used to generate an overlay on the document on the second users system. When the overlay window is displayed with the first user's annotations on the second user's graphical user interface, the second user is able to see the annotations overlaying the document. FIG. 5a illustrates a graphical user interface display 500 on the second user's system where the resolution is the same as on the first user's system, e.g., overlay window 420 is displayed over document 410 in the same resolution as shown in FIG. 4b. FIG. 5b illustrates a situation where the second user's system has a different resolution and/or aspect ratio than the first user's system. Here the graphical user interface 550 (with a different aspect ratio for example), includes the displayed document (now 560 to indicate a different document aspect ratio or size). The positioning information associated with the overlay is used to appropriately scale the overlay 570 so that the sizing and positions of the displayed annotations relative to the document contents closely match that in the original system.

FIG. 6 illustrates an example of an overlay floating over a document. As shown annotations by a user are displayed in the overlay over the document (underlined "the" and an arrow pointing to Sample 2).

The first user may create a second overlay for the document 410 and allow access to the second user. The second user may access and display the second overlay over the document in addition to the first overlay, or as a replacement for the first overlay. Similarly, a third user may create a separate overlay for the document and allow access to other users, including the second user. The second user may access and display the third user's overlay (and annotations) over the document in addition to the first user's overlay, or as a replacement for the first user's overlay. For example, in one embodiment, when multiple overlays are available for display over a document (whether created by the same user or multiple users) a visual indicator may be displayed to indicate the number of available overlays for the document and/or to allow the viewing user to select from among the available overlays. For example, the viewing user may select one, more than one, or all of the available overlays to be simultaneously displayed over the document being viewed. In certain aspects, where multiple overlays are available for display, the overlays may be color-coded according to creating user, or otherwise distinguished based on user. FIG. 7 illustrates two different overlays displayed over a document. As shown, overlay 1 is positioned over a different portion of the document than overlay 2. In the situation where overlay 1 and overlay 2 were created by different users, they may be displayed in different colors or shadings to help the viewing user distinguish the source. Alternatively or additionally, a user indicator such as an icon or text can be displayed with the overlay to identify the source.

It should be appreciated that overlays can be shared in real-time, or in near real time, as the overlay is being created. For example, in an on-line interactive collaboration session, annotations being input by a user on one system can be transmitted to systems of other users partaking in the collaborative effort as the annotations are being created, or just after the annotations have been created (and the creating user indicates acceptance, for example).

In one embodiment, a user is able to integrate annotations provided in an overlay into the underlying document. For example, a user may be able select or indicate 0, 1, or a number of the overlays and flatten or permanently integrate them into the underlying document. In FIG. 3 this is represented as step 380, where the selected overlays are considered to be 'approved' and therefore are incorporated into the final document.

Overlay Controls

According to one embodiment, various overlay controls are provided for use by a user. Examples of useful overlay controls include controls to create a new overlay, to save or delete an overlay, to control display parameters of an overlay. In one embodiment, one or more of the following user controls are provided:

1) Create new overlay. This control allows a user to create a new overlay for a document, or page of a document. Note that support for more than one overlay is useful as it allows for alternate annotations.

2) Save overlays. This control allows a user to save an overlay or a set of overlays, along with information relevant to the overlays and the documents (e.g., overlay size/resolution, document name, document page(s), document zoom, display order, etc.)

3) Delete overlays. This control allows a user to delete specific overlays or sets of overlays which are no longer needed.

4) Overlay notes. This control allows a user to add additional notes to an overlay which do not actually appear on the overlay (these notes are not annotations of the document). One purpose of these notes may be to provide context or background information.

5) Overlay display control. This control allows a user to display an individual overlay or sets of overlays. If sets of overlays are shown, the display order is respected, by default.

6) Overlay default color control. To help with discrimination when multiple overlays are shown, this control allows a user to set the default color for an overlay. For instance, different users could use different colors, making it possible, even when all overlays are shown, to determine who specified what.

In one embodiment, a tool to 'hide' sections of the underlying document is provided. While this will not actually delete material from the underlying document (nor cause it to reflow), it will hide that section while the overlay is displayed.

Overlay Positioning and Scaling

In one embodiment, to properly show an overlay across different systems or in different viewings of a document, certain pieces of information are persisted with each overlay set: the document size/resolution, the document zoom, and the document position. Using this information it is possible to scale the overlays such that they closely match their original position. In one embodiment, the position information includes a percentage of the current screen resolution. For example, if the vertical position is indicated as extending from 20% to 80% from the top to the bottom of the document (and similarly the horizontal position as extending from x % to y % from left to right) this can be used to scale the overlay over a different resolution. The pixel count can change between documents, but the percentage would remain the same.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A database system, comprising: a processing system; and
a memory device coupled to the processing system, the memory device having instructions stored thereon that, in response to execution by the processing system, cause the processing system to perform operations comprising:
storing, by the processing system of the database system, a plurality of subscriptions, each of the subscriptions associated with a different subscriber of a plurality of subscribers, each subscriber associated with a permission level of a plurality of permission levels;
receiving first information uploaded from a first remote user system over a network, wherein the first information comprises annotation information including annotations and positioning information;
determining whether to grant one of the subscribers access to the annotations; and in response to determining to grant the one of the subscribers access to the annotations, downloading second information to be used to graphically annotate content on a second remote user system without modification of said content on the second remote user system, wherein the second information that is different from the received first information and the second remote user system that is different from the first remote user system;
wherein said content comprises at least one of text, an image, flash based images or video, and the content is created using at least one of a plurality of document creation applications; and wherein the second different information comprises an overlay having a transparent work area to align to an arbitrary format display corresponding to the content.

2. The database system of claim 1, wherein the operations further comprise:

determining a pixel count associated with the second remote user system; determining a product of the pixel count and a quotient of a pixel count of an overlay window of the annotation information and a pixel count associated with the first remote user system and generating the second information responsive to determining the product.

3. The database system of claim 1, wherein the operations further comprise: in response to determining to grant the one of the subscribers access to the annotations, determining whether a value corresponding to the one of the subscribers is equal to a predetermined value;

downloading third information to the second remote user system in response to determining that the value corresponding to the one of the subscribers is not equal to the predetermined value.

4. The database system of claim 1, wherein the operations further comprise scaling, by the database system, the annotation information to generate the second information, wherein the generated second information includes annotation information that is different from the annotation information of the first information.

5. The database system of claim 1, wherein the operations further comprise:

generating, by the database system, an overlay window to be displayed over a portion of a document associated with the annotation information, the overlay window including the annotations and in accordance with the positioning information and generating the second information based on the overlay window.

6. The database system of claim 1, wherein the operations further comprise: receiving a request from the second remote user system to incorporate the first information into a document retained by the database system; and updating, by the database system, a record of the database system that corresponds to the document responsive to receiving the request.

7. The database system of claim 1, wherein the positioning information includes a first value corresponding to at least one of a size or resolution of a document that corresponds to the annotation information.

8. The database system of claim 7, wherein the positioning information includes a second value corresponding to a document zoom.

9. The database system of claim 8, wherein the positioning information includes a third value corresponding to a document position.

10. The database system of claim 9, wherein the operations further comprise scaling, by the database system, at least a portion of the first information using the first value, the second value, and the third value.

11. The database system of claim 10, wherein the operations further comprise determining a pixel count corresponding to the second remote user system, and wherein the scaling by the database system is responsive to determining the pixel count corresponding to the second remote user system.

12. A method, comprising:

storing, by a processing system of a database system, a plurality of subscriptions, each of the subscriptions associated with a different subscriber of a plurality of subscribers, each subscriber associated with a permission level of a plurality of permission levels;

receiving at the database system first information uploaded from a first remote user system that is coupled to the database system over a network, wherein the first information comprises annotation information including annotations and positioning information;

determining, by the processing system, whether to grant one of the subscribers access to the annotations; and in response to determining to grant the one of the subscribers access to the annotations, downloading second information to be used to graphically annotate content that originates from an arbitrary document creation application and includes an arbitrary format without modification of said content on the second remote user system, wherein the second information that is different than the received first information and the downloading is to a second remote user system that is different from the first remote user system; and wherein the second different information comprises an overlay having a transparent work area to align to an arbitrary format display corresponding to the content.

13. The method of claim 12, further comprising:

determining a pixel count associated with the second remote user system; and determining a product of the pixel count and a quotient of a pixel count of an overlay window of the annotation information and a pixel count associated with the first remote user system and generating the second information responsive to determining the product.

14. The method of claim 12, further comprising:

in response to determining to grant the one of the subscribers access to the annotations, determining whether a value corresponding to the one of the subscribers is equal to a predetermined value;

downloading third information to the second remote user system in response to determining that the value corresponding to the one of the subscribers is not equal to the predetermined value.

15. The method of claim 12, further comprising scaling, by the database system, the annotation information to generate the second information, wherein the generated second information includes annotation information that is different from the annotation information of the first information.

16. The method of claim 12, further comprising:

generating, by the database system, an overlay window to be displayed over a portion of a document associated with the annotation information, the overlay window including the annotations and in accordance with the positioning information and generating the second information based on the overlay window.

17. The method of claim 12, further comprising:

receiving a request from the second remote user system to incorporate the first information into a document retained by the database system; and updating, by the database system, a record of the database system that corresponds to the document responsive to receiving the request.

18. The method of claim 12, wherein the positioning information includes a first value corresponding to at least one of a size or resolution of a document that corresponds to the annotation information.

19. The method of claim 18, further comprising:

determining a pixel count corresponding to the second remote user system; and scaling, by the database system, at least a portion of the first information using the first value, a second value included in the positioning information and corresponding to a document zoom, and a third value included in the positioning information and corresponding to a document position, wherein the scaling is responsive to determining the pixel count corresponding to the second remote user system.

20. The method of claim 14, wherein the third information includes a document that is associated with the annotations.

* * * * *